United States Patent
Vendrow

(10) Patent No.: US 10,637,922 B2
(45) Date of Patent: *Apr. 28, 2020

(54) SYSTEMS AND METHODS FOR INITIATING A PEER-TO-PEER COMMUNICATION SESSION

(71) Applicant: RingCentral, Inc., Belmont, CA (US)

(72) Inventor: Vlad Vendrow, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/995,804

(22) Filed: Jun. 1, 2018

(65) Prior Publication Data

US 2018/0278682 A1    Sep. 27, 2018

Related U.S. Application Data

(63) Continuation of application No. 15/186,009, filed on Jun. 17, 2016, now Pat. No. 10,015,246, which is a continuation of application No. 14/536,579, filed on Nov. 7, 2014, now Pat. No. 9,398,085.

(51) Int. Cl.
*G06F 15/16* (2006.01)
*H04L 29/08* (2006.01)
*H04L 29/06* (2006.01)

(52) U.S. Cl.
CPC .... *H04L 67/1063* (2013.01); *H04L 29/08144* (2013.01); *H04L 65/1069* (2013.01); *H04L 67/104* (2013.01); *H04L 67/16* (2013.01)

(58) Field of Classification Search
CPC .......... H04L 67/1063; H04L 29/08144; H04L 65/1069; H04L 67/104; H04L 67/106
USPC ....................................................... 709/203
See application file for complete search history.

(56) References Cited

U.S. PATENT DOCUMENTS

| | | | |
|---|---|---|---|
| 6,247,057 B1 | 6/2001 | Barrera, III | |
| 7,945,612 B2 | 5/2011 | Raghav et al. | |
| 8,024,397 B1 | 9/2011 | Erickson et al. | |
| 8,543,527 B2 | 9/2013 | Bates et al. | |
| 8,543,665 B2 | 9/2013 | Ansari et al. | |
| 8,700,590 B2 | 4/2014 | Raghav et al. | |
| 9,398,085 B2 | 7/2016 | Vendrow | |
| 2002/0099854 A1 | 7/2002 | Jorgensen | |
| 2006/0067249 A1 | 3/2006 | Poustchi et al. | |
| 2006/0239251 A1* | 10/2006 | Bennett | H04L 29/06027 370/352 |
| 2008/0013546 A1 | 1/2008 | Bhatt et al. | |
| 2008/0120129 A1 | 5/2008 | Seubert et al. | |

(Continued)

*Primary Examiner* — Anthony Mejia
(74) *Attorney, Agent, or Firm* — Finnegan, Henderson, Farabow, Garrett & Dunner, LLP

(57) ABSTRACT

Systems and methods are disclosed for initiating a peer-to-peer communication session. According to certain embodiments, at least one peer device is identified. A first request is sent to the at least one peer device for an inventory of service capabilities of the at least one peer device. The requested inventory of service capabilities of the at least one peer device is received from the at least one peer device. A second request is sent to the at least one peer device to initiate a communication session with the at least one peer device using at least one service from the requested inventory of service capabilities.

20 Claims, 7 Drawing Sheets

(56) References Cited

U.S. PATENT DOCUMENTS

| | | | |
|---|---|---|---|
| 2008/0192770 A1* | 8/2008 | Burrows | H04L 65/104 |
| | | | 370/466 |
| 2008/0279119 A1 | 11/2008 | Stille et al. | |
| 2009/0083441 A1 | 3/2009 | Clark et al. | |
| 2010/0049846 A1 | 2/2010 | Ballette et al. | |
| 2010/0177711 A1 | 7/2010 | Gum | |
| 2011/0063407 A1 | 3/2011 | Wang | |
| 2011/0110505 A1 | 5/2011 | Arthur et al. | |
| 2011/0145314 A1 | 6/2011 | Knize et al. | |
| 2011/0154222 A1 | 6/2011 | Srinivasan et al. | |
| 2011/0228750 A1 | 9/2011 | Tomici et al. | |
| 2012/0030365 A1 | 2/2012 | Lidstrom et al. | |
| 2012/0071200 A1 | 3/2012 | Bienas et al. | |
| 2012/0072499 A1 | 3/2012 | Cipolli et al. | |
| 2012/0331166 A2 | 10/2012 | Stirbu et al. | |
| 2013/0281086 A1 | 10/2013 | Michaelis et al. | |
| 2013/0282820 A1* | 10/2013 | Jabri | H04L 65/403 |
| | | | 709/204 |
| 2014/0171065 A1 | 6/2014 | Graessley | |
| 2014/0362764 A1 | 12/2014 | Aksu | |
| 2015/0044987 A1* | 2/2015 | Menon | H04M 15/705 |
| | | | 455/406 |
| 2015/0046826 A1 | 2/2015 | Mann et al. | |
| 2015/0081769 A1 | 3/2015 | Mandyam et al. | |
| 2015/0350714 A1* | 12/2015 | Normile | H04N 21/433 |
| | | | 725/32 |
| 2016/0024161 A1 | 1/2016 | Matschiner et al. | |
| 2016/0119387 A1 | 4/2016 | Vendrow et al. | |
| 2017/0237790 A1* | 8/2017 | Patel | H04L 65/4061 |
| | | | 709/203 |

* cited by examiner

SYSTEMS AND METHODS FOR INITIATING A PEER-TO-PEER COMMUNICATION SESSION

CROSS REFERENCE TO RELATED APPLICATIONS

This application is a continuation of and claims priority to U.S. patent application Ser. No. 15/186,009, filed Jun. 17, 2016, which is a continuation of U.S. patent application Ser. No. 14/536,579, filed Nov. 7, 2014, the entire contents of which are hereby incorporated by reference.

BACKGROUND

The present disclosure relates to communications networks, and particularly to initiating peer-to-peer communication sessions among devices in such networks.

The types of devices and services that users employ to effect electronic communications with one another have expanded significantly in recent years. For example, whereas users once used phones solely to engage in audio communications with one another, smart phones now enable people to engage in a wide variety of different types of electronic communications with one another, including video conferencing, text messaging, email, instant messaging, and location sharing. Moreover, smart phone users can communicate seamlessly with users of other devices, such as tablets and laptops, using each of these services. Different devices, however, can have different service capabilities, which can vary based on device type and a service plan associated with the device, among other factors.

Although expanded service capabilities have enabled more efficient communication, users are usually only able to communicate with one another if they have exchanged certain information regarding their service capabilities. For example, in order for two users to exchange instant messages with one another, each user must first be aware that the other user has the capability to exchange instant messages and second know the instant messaging user name or handle associated with the other user. Moreover, users may prefer certain forms of communication over others. For example, a user may prefer to communicate via email than to communicate via text message or a voice call.

Users are generally unaware of the full inventory of services that they can use to communicate with one another unless they have told one another about their service capabilities and provided one another with the necessary credentials to engage in communication using those services. Thus, whereas two users may know how to communicate with one another using one mode (e.g., a voice call), the two users may be unaware of other potential modes that they can use to communicate with one another. Aspects of the disclosed embodiments address these and other concerns regarding electronic communications.

SUMMARY

Consistent with the present disclosure, systems and methods are provided for initiating a peer-to-peer communication session between devices using a selected service. Embodiments consistent with the present disclosure include computer-implemented systems and methods for discovering one or more peer devices, including information regarding their service capabilities, and initiating a communication session with a peer device using a selected service. Systems and methods consistent with the present disclosure can identify peer devices using Near Field Communication (NFC), Bluetooth®, WiFi, or similar communication protocols, or by requesting an inventory of peer devices from a server. Embodiments consistent with the present disclosure can overcome one or more of the drawbacks or problems set forth above.

In accordance with some example embodiments, a computerized method is provided for initiating a peer-to-peer communication session. According to the method, at least one peer device is identified. The method also includes sending a first request to the at least one peer device for an inventory of service capabilities of the at least one peer device. The requested inventory of service capabilities of the at least one peer device is received from the at least one peer device. Further, the method includes sending a second request to the at least one peer device to initiate a communication session with the at least one peer device using at least one service from the requested inventory of service capabilities.

In accordance with some example embodiments, a system is provided for initiating a peer-to-peer communication session. The system includes a network interface and at least one processor in communication with the network interface. The processor is configured to identify at least one peer device. The processor is also configured to send, via the at least one network interface, a first request to the at least one peer device for an inventory of service capabilities of the at least one peer device. Moreover, the processor s configured to receive, from the at least one peer device, the requested inventory of service capabilities of the at least one peer device. Further, the processor is configured to send a second request to the at least one peer device to initiate a communication session with the at least one peer device using at least one service from the requested inventory of service capabilities.

In accordance with some example embodiments, a computer readable storage medium is provided including a set of instructions that are executable by at least processor to cause the at least one processor to initiate a peer-to-peer communication session. When executed, the set of instructions can cause at least one processor to perform steps for identifying at least one peer device. The instructions can further cause the processor to send a first request to the at least one peer device for an inventory of service capabilities of the at least one peer device. The steps performed by the processor also include receiving, from the at least one peer device, the requested inventory of service capabilities of the at least one peer device. Moreover, the steps performed by the processor include sending a second request to the at least one peer device to initiate a communication session with the at least one peer device using at least one service from the requested inventory of service capabilities.

Before explaining certain example embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, it is appreciated that the conception and features upon which this disclosure is based can readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various example embodiments disclosed herein.

DETAILED DESCRIPTION

Figure 1:
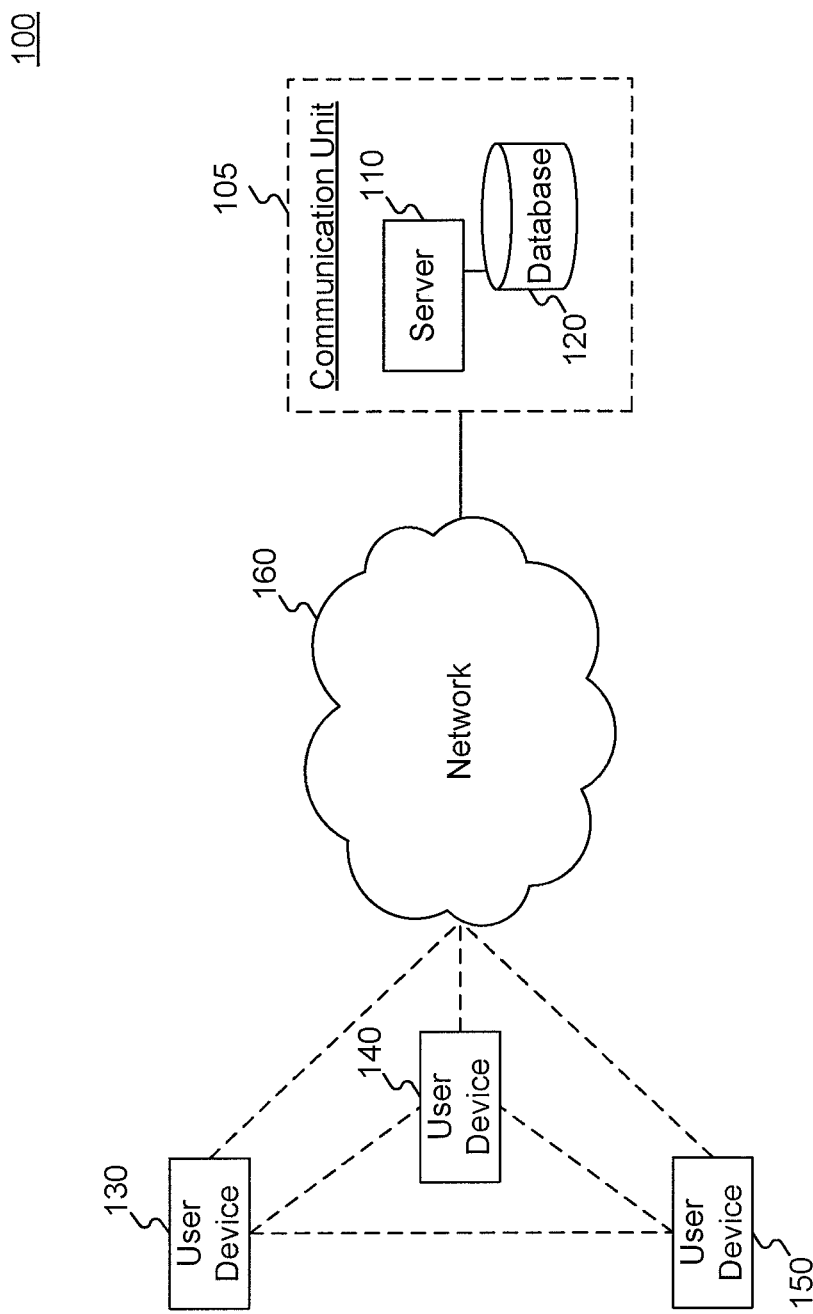
FIG. 1 is a diagram of an example system environment for implementing embodiments consistent with the present disclosure.

Reference will now be made in detail to the embodiments implemented according to this disclosure, the examples of which are illustrated in the accompanying drawings. Wherever possible, the same reference numbers will be used throughout the drawings to refer to the same or like parts.

Embodiments of the present disclosure provide improved systems and methods for initiating a peer-to-peer communication session. The disclosed example embodiments enable user devices to identify peer devices and discovery their communication capabilities. In some embodiments, a user device can discover peer devices using NFC, WiFi, Bluetooth®, or similar communication protocols. In other embodiments, a user device can become aware of the services available on a peer device during the initiation of a communication session (for example a telephone call or a video conference session). In other embodiments, a user device can request an inventory of peer devices from a server and select a peer device from the received inventory of peer devices.

According to certain embodiments, the user devices can communicate with one another using one or more services, such as audio conferencing, video conferencing, screen sharing, text messaging, instant messaging, whiteboarding, and location sharing. The type of services that are available at a particular device, however, can differ from device to device. For example, the user devices can be mobile phones, landline phones, Voice over IP (VoIP) phones, gateways, audio and/or video conferencing devices, gaming consoles, personal computers, smartwatches, laptops, or tablets, each of which can provide different communication capabilities. Accordingly, after a user device has identified a peer device with which it wishes to communicate, it can request an inventory of service capabilities of the peer device (i.e., the different services through which the peer device can communicate). The peer device provides the inventory of its services for performing electronic communications, and the requesting user device can select from among this inventory of services a mode through which to communicate with the peer device. In some embodiments, a user device requests an inventory of service capabilities for a peer device from a server. In these embodiments, the user device receives the inventory of service capabilities for the peer device from a server, selects a service, and sends a request to the peer device to initiate a communication session using the selected service.

The example embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The ten "computer-readable storage medium" should be understood to include tangible items and exclude carrier waves and transient signals.

FIG. 1 depicts an example system environment for implementing embodiments of the present disclosure. The example embodiment of FIG. 1 depicts a system environment 100, which includes three example user devices (e.g., user devices 130, 140, and 150). One or more of the user devices can be coupled to a network (e.g., network 160), such as a local area network or the Internet. Moreover, the user devices 130-150 can communicate with one another using NFC, Bluetooth®, WiFi, or similar technologies. For example, the user devices 130-150 can be coupled to the same WiFi access point to form a local area network and, thus, communicate with one another through that network via WiFi.

The user devices 130-150 can include a variety of devices that are capable of peer-to-peer communications, such as mobile phones, landline phones, Voice over IP (VoIP) phones, gateways, audio and/or video conferencing devices, gaming consoles, personal computers, laptops, smartwatches, or tablets. Moreover, each of the user devices 130-150 can be capable of communicating with peer devices using different services, such as audio conferencing, video conferencing, screen sharing, text messaging, instant messaging, whiteboarding, and location sharing. The services associated with electronic communications and available on each user device 130-150 can vary, for example, based on the device type (e.g., laptop or mobile phone), hardware (e.g., camera or microphone), and software (e.g., communication applications installed on the device).

Moreover, users associated with the user devices 130-150 can have different communication preferences. For example, user device 130 can be capable of providing several modes for communicating with other user devices, such as audio conferencing, video conferencing, text messaging, and instant messaging, but a user associated with user device 130 may prefer to communicate with other users regarding non-urgent matters only via text messaging. Accordingly, each user device 130-150 can be associated with one or more user profiles that describe the communication preferences of the users associated with the user device 130-150. These user profiles may be stored on the user devices 130-150. In some embodiments, a user device 130-150 that is associated with multiple users (e.g., a shared laptop) can store multiple user profiles, each of which can indicate different communication preferences. In other words, each user may have different preferences for how the user communicates with others using the user device 130-150. Thus, the user profiles can indicate different rankings or priorities for the services available at the device.

In some embodiments, a user profile associates each service that the user device 130-150 is capable of providing with a ranking or priority indicating the user's preference for communicating with other users using that service. Thus, the profile of a user who prefers to communicate via instant messaging and does not prefer to communicate via video conferencing can associate instant messaging with a higher priority and video conferencing with a lower priority. In some embodiments, each service is associated with a different priority, such that the user profile stores a ranking of each of the services. For example, if a user device 130-150 supports five different services, each of the five services can be associated with a unique priority from 1 to 5.

According to certain embodiments, the priority associated with a service differs based on a type of network connection. In other words, a user can prefer to communicate using one service (e.g., video conferencing) when the user device 130-150 is coupled to the network via WiFi, but prefer to communicate using another service (e.g., audio conferencing) when the user device 130-150 is coupled to the network via cellular data. For example, the user may prefer to communicate via video conferencing only when coupled to the network via WiFi to avoid costs associated with transferring large volumes of media data over the cellular network. These costs may include monetary costs (e.g., monetary charges imposed by the service provider for cellular data transfer) and/or bandwidth costs (e.g., delay due to limited bandwidth for transfers over cellular network). Thus, in some embodiments, each service can be associated with two priorities: a first priority that represents the user's preference for that service when the user device 130-150 is coupled to the network via WiFi and a second priority that represents the user's preference for that service when the user device 130-150 is coupled to the network via cellular data. Moreover, each service can be associated with a threshold download speed (e.g., 5 mbps) or a threshold upload speed (e.g., 1 mbps). Thus, a user device 130-150 can allow a user to communicate via video conferencing only if the current upload speed for the user device is greater than 1 mbps, or only if the user device is coupled to the network via WiFi.

In some embodiments, user devices 130-150 identify peer devices using NFC, Bluetooth®, WiFi, or similar communication protocols. For example, a user device 130-150 can use Bluetooth® to discover all proximately located devices (e.g., all devices within ten meters) that have Bluetooth® functionality activated. A user device 130-150 can use NFC to discover proximately located NFC-enabled devices (e.g., NFC-enabled devices within 10 centimeters). A user device 130-150 can also use WiFi to identify peer devices that are coupled to the same wireless network. In other embodiments, a user device 130-150 requests an inventory of user devices 130-150 from a server, such as communication unit 105 or server 110. For example, a server can store an inventory of available user devices 130-150, along with other information, such as an inventory of service capabilities of each device 130-150 and one or more user profiles associated with each device 130-150. The server provides the requested inventory of peer devices 130-150 to the requesting user device, such that the requesting user device 130-150 can select a peer device 130-150 with which to communicate.

In addition to identifying peer devices 130-150, user devices 130-150 can also request information regarding the communication capabilities of peer devices 130-150, so that a user can determine how the user wishes to communicate with a peer. In some embodiments, the user device 130-150 sends a request to an identified peer device 130-150 for an inventory of service capabilities of the peer device 130-150. This request can be send via NFC, Bluetooth®, WiFi, or similar communication protocols, or over a network using cellular data or Ethernet connection. The identified peer device 130-150 responds to the requesting user device 130-150 with an inventory of the service capabilities of the peer device. For example, the peer device 130-150 can send a response that indicates that the peer device 130-150 can communicate via audio conferencing, video conferencing, or screen sharing. In some embodiments, the peer device 130-150 also sends user preference information that describes the communication preferences of one or more users associated with the peer device 130-150. For example, the peer device 130-150 can send the requesting device a user profile that associates a ranking or priority with each of the peer device's service capabilities, so that the user associated with the requesting user device 130-150 will be more inclined to communicate with the peer using a service that is convenient to the peer. According to some embodiments, the requesting user device 130-150 submits a request for an inventory of available services for a peer device 130-150 to a server (e.g., communication unit 105 or server 110), and the server provides the inventory of service capabilities for the peer device 130-150 to the requesting user device 130-150.

User devices 130-150 are also configured to engage in communications with one another. Accordingly, after a user device 130-150 has identified one or more peer devices 130-150 and received an inventory of service capabilities associated with a peer device 130-150, the user device 130-150 can send a request to initiate a communication session with the peer device 130-150 using one of the services identified in the inventory of service capabilities associated with the peer device 130-150. In some embodiments, the user device 130-150 sends a request to initiate a peer-to-peer communication with one or more selected peer devices 130-150. For example, the user device 130 can send a request to initiate a video conferencing session to a selected peer device 150. The peer device 130-150 can accept or reject the user device's request to initiate the video conferencing session. If the peer device 130-150 accepts the user device's request, then a peer-to-peer video conferencing session is initiated and the users of the user device 130-150 and peer device 130-150 can communicate with one another in a video conference. If the peer device 130-150 rejects the user device's request, then the user of the user device 130-150 can attempt to communicate with the peer device 130-150 using another service (or decide not to communicate with the peer device 130-150).

For some services, such as text messaging or instant messaging, a user device 130-150 can simply send a communication to a peer device 130-150 after the user device 130-150 is aware of the different service capabilities of the peer device 130-150, rather than sending a request to the peer device 130-150 to initiate a communication session using the service. For example, a user device 130-150 can send a text message to a peer device 130-150, regardless of whether the user associated with the peer device 130-150 is available to engage in a communication session with the user of the user device 130-150, because text messages can be sent asynchronously between two devices, without acknowledgement or assent by the receiving device.

In some embodiments, a server, such as communication unit 105 or server 110, can host communication sessions among two or more peer devices 130-150. Accordingly, in these embodiments, a user device 130-150 sends a request to a server 110 to initiate a communication session with a peer device 130-150. The server 110 forwards the request to the peer device 130-150. The peer device 130-150 can accept or reject the request to initiate the communication session and send the acceptance or rejection to the server 110. The server 110 forwards the acceptance or rejection to the requesting user device 130-150. If the peer device 130-150 accepts the request to initiate a communication session, then the server 110 can host a communication session between the two peer devices 130-150.

Communication unit 105 includes one or more server systems, databases, and computing systems configured to receive information from user devices over a network, process the information, host communications among the user devices based on the received information, and transmit information to the user devices over the network. In some embodiments, communication unit 105 includes a server 110 and one or more database(s) 120, which are illustrated in a region bounded by a dashed line for communication unit 105 in FIG. 1.

In some embodiments, communication unit 105 transmits and receives data to and from various other components, such as user devices 130, 140, and 150, among others. More specifically, communication unit 105 can be configured to receive and store data transmitted from user devices 130-150 over an electronic network 160 (e.g., comprising the Internet), process the received data, transmit data to user devices 130-150 over the electronic network 160, and host communications among user devices 130-150.

According to certain embodiments, communication unit 105 stores an inventory of user devices. For example, an identifier associated with each user device that communicates with communication unit 105 can be stored by communication unit 105, for example, in one or more database(s) 120. Database 120 can be any suitable combination of large scale data storage devices, which can optionally include any type or combination of slave databases, load balancers, dummy servers, firewalls, back-up databases, and any other desired database components. Moreover, communication unit 105 can store other information regarding the user devices 130-150 in its inventory, such as an inventory of service capabilities of each user device 130-150 and user preferences (e.g., one or more user profiles) associated with each user device 130-150. The user preferences can associate a ranking or priority with each service in a user device's inventory of services, as discussed above.

In some embodiments, communication unit 105 receives and responds to requests from user devices 130-150 for an inventory of peer devices 130-150 with which a user device can communicate. Communication unit 105 can also receive and respond to requests from user devices 130-150 for an inventory of service capabilities of a peer device 130-150. For example, user device 130 can transmit a request over network 160 to communication unit 105 for an inventory of peer devices with which user device 130 can communicate. Communication unit 105 can identify user devices 140 and 150 as peer devices and send the identification of these devices to user device 130. A user associated with user device 130 can then select to communicate with user device 140 and transmit a request over network 160 to communication unit 105 for an inventory of service capabilities of user device 140. Communication unit 105 can send user device 130 information regarding the service capabilities of user device 140. User device 130 can then send a request to user device 140 to initiate a communication session with user device 140 using a selected service.

According to some embodiments, communication unit 105 receives requests to initiate a communication session including two or more user devices, such as user devices 130-150. Thus, rather than engaging in peer-to-peer communications, two or more user devices 130-150 can communicate with one another through a server, such as communication unit 105. The communication session can be established using the Session Initiation Protocol (SIP).

Figure 2:
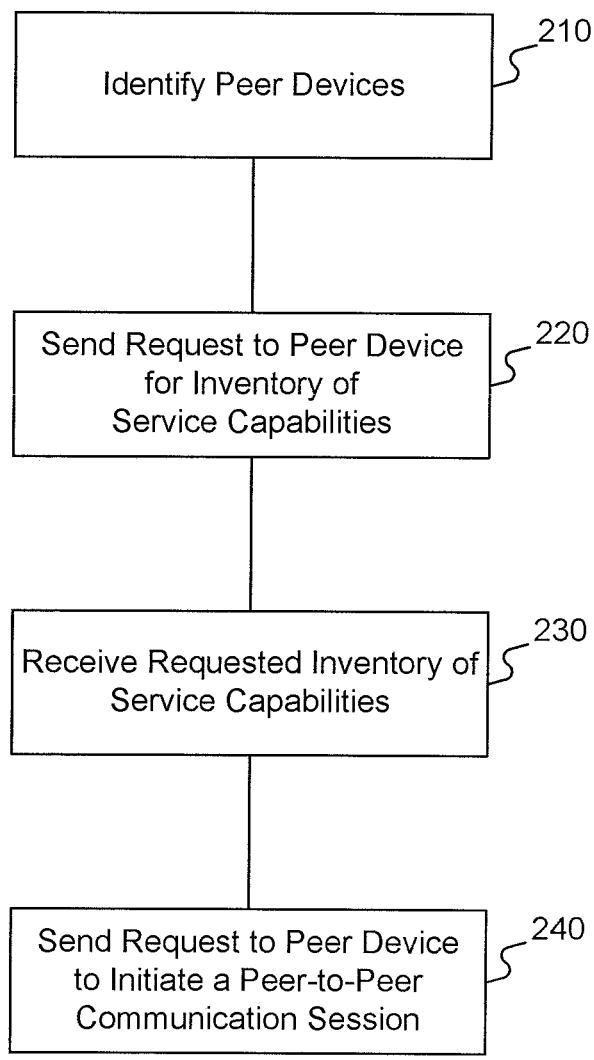
FIG. 2 illustrates an example process for initiating a peer-to-peer communication session, in accordance with embodiments of the present disclosure.

FIG. 2 depicts an example process 200 for initiating a peer-to-peer communication session, in accordance with some embodiments of the present disclosure. The steps associated with this example process can be performed by the components of FIG. 1, 3, 4, 5, 6, or 7. In the following description, reference is made to certain components of FIG. 1 for purposes of illustration. It will be appreciated, however, that other implementations are possible and that components other than that illustrated in FIG. 1 can be utilized to implement the example method of FIG. 1.

In step 210, a user device (e.g., user device 130) identifies at least one peer device (e.g., user device 140 or 150) with which the user device can communicate. For example, the user device 130 can discover an inventory of peer devices using NFC, Bluetooth®, WiFi, or similar communication protocols, and select at least one peer device from the inventory of discovered peer devices. According to certain embodiments, the user device 130 can send a request to a server 110 for an inventory of peer devices (e.g., peer devices that have previously been in communication with the server 110). In these embodiments, the user device 130 receives the inventory of peer devices 140 and 150 from the server 110 and selects at least one peer device from the received inventory of peer devices 140 and 150.

The user device 130 sends, via at least one network interface, a first request to the at least one peer device 140 or 150 for an inventory of service capabilities of the at least one peer device 140 or 150 at step 220. The inventory of service capabilities of the peer device 140 or 150 can include audio conferencing, video conferencing, screen sharing, text messaging, instant messaging, whiteboarding, and location sharing. At step 230, the user device 130 receives, from the at least one peer device 140 or 150, the requested inventory of service capabilities of the at least one peer device 140 or 150. According to certain embodiments, the user device 130 can also receive, from the at least one peer device 140 or 150, preference information associating each of the service capabilities of the peer device 140 or 150 with a preference for communicating using the service.

At step 240, the user device 130 sends a second request to the at least one peer device 140 or 150 to initiate a communication session with the at least one peer device 140 or 150 using at least one service from the requested inventory of service capabilities. For example, the user device 130 can select a service from the inventory of service capabilities received from the peer device 140 or 150 and send a request to initiate a communications session with the at least one peer device 140 or 150 using the selected service. After receipt of the peer device's acceptance of the request, the user device 130 initiates a communication session with the peer device 140 or 150 using the at least one service from the received inventory of service capabilities.

Figure 3:
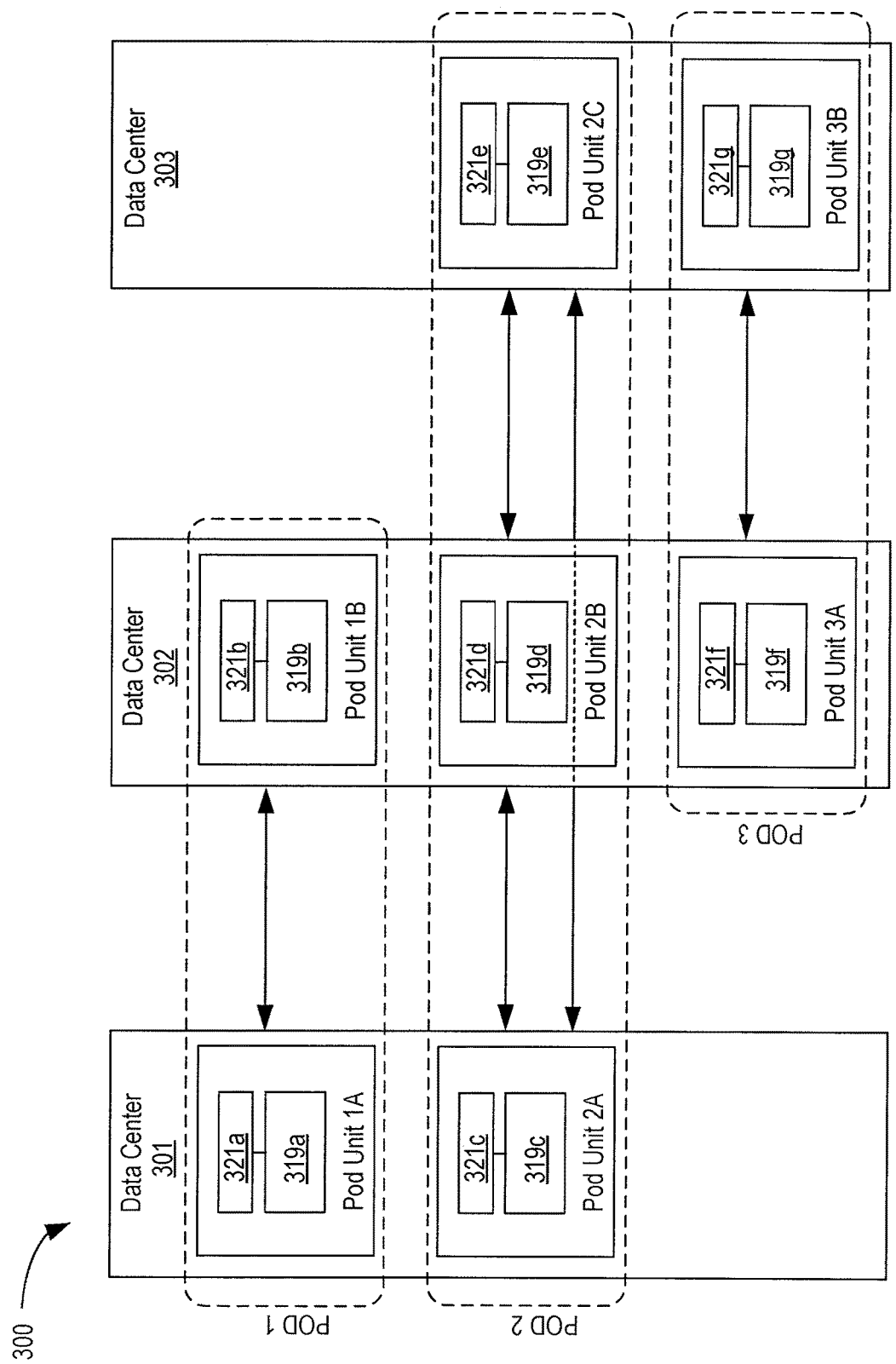
FIGS. 3 and 4 are simplified diagrams of an example of a communication system in which various implementations described herein may be practiced.

FIG. 3 shows an example of a communication system 300 in which systems and methods for initiating a peer-to-peer communication session as described herein may be implemented. In some examples, components of communication system 300 can be used to implement computer programs, applications, methods, processes, or other software to perform the above-described techniques and to realize the structures described herein. For example, communication server 319*a*-319*g* can be used to implement the functionalities of server 110, and account database 321*a*-321*g* can be used to implement the functionalities of database 120.

System 300 can be, for example, a telephony system such as a hosted Private Branch Exchange (PBX) platform that provides voice and video over IP, fax services, etc. Communication system 300 includes data centers 301, 302, and 303. Each data center is a point of presence (POP) that includes the network computing resources (e.g., servers, routers, switches, network connections, storage devices, etc.) for supporting the services provided by communication system 300. Each data center is typically located in a different geographical region.

In the depicted example, communication system 300 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 319*a*-319*g* configured to provide substantially the same services to the same subset of users as the other pod units within the same pod. Each pod unit also includes an account database 321*a*-321*g* configured to support the respective communication servers for the corresponding subset of users. It should be noted that the term "user" is being used in the interest of brevity and may refer to any of a variety of entities that may be associated with a subscriber account such as, for example, a person, an organization, an organizational role within an organization, a group within an organization, etc.

Figure 4:
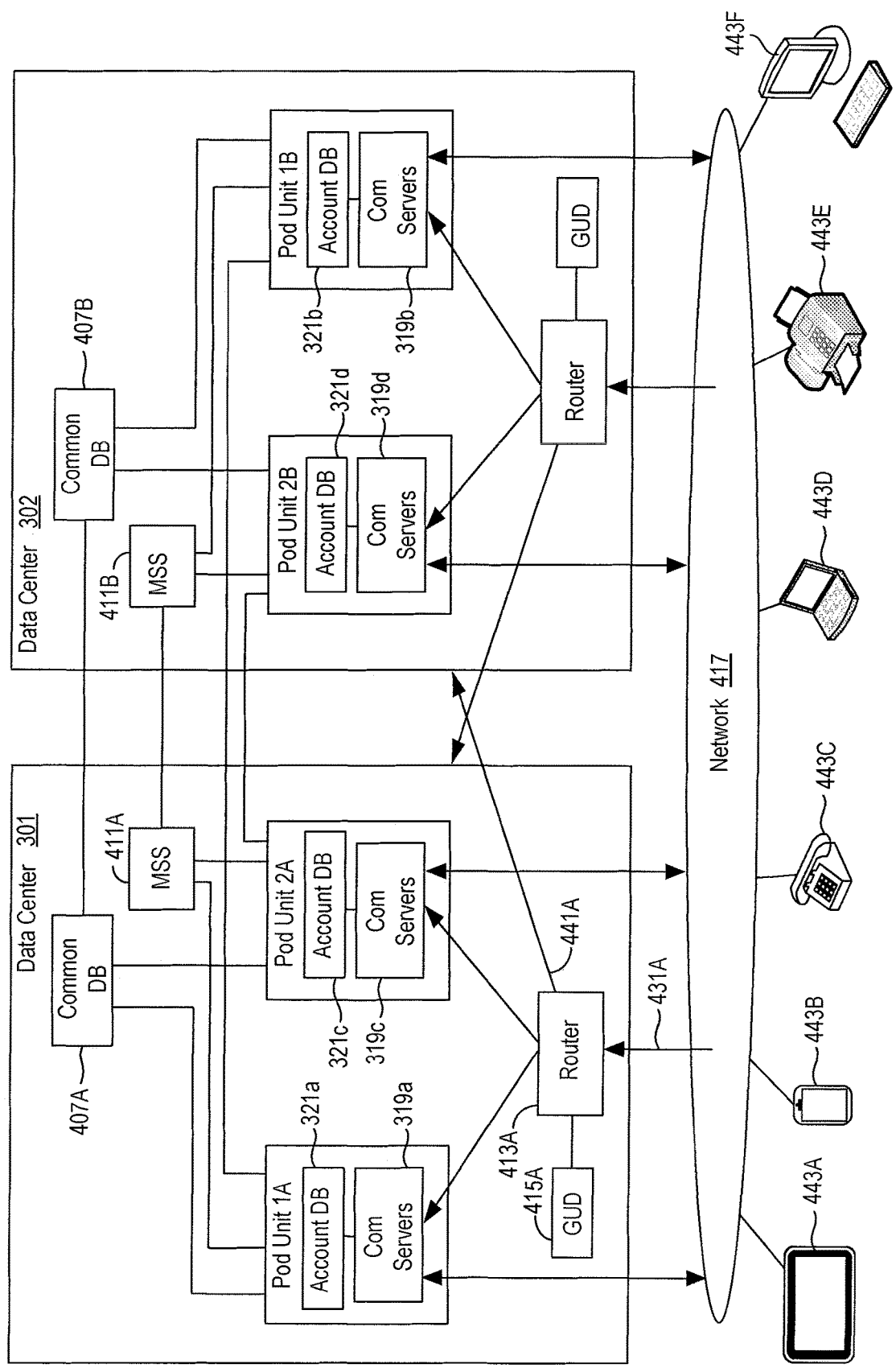

FIG. 4 shows various components of communication system 300 of FIG. 3. Specifically, FIG. 4 shows the various interconnections within and between data centers 301 and 302. Both data centers are in communication with network 417. Service requests from various communication devices 443A-443F are routed through network 417 to either or both of the data centers. Devices 443A-443F represent a diversity of client devices that connect with a services system designed in accordance with one or more implementations as described herein. Such client devices include, for example (and without limitation), cell phones, smart phones, tablets, laptop and desktop computers, conventional telephones, IP phones, teleconferencing devices, videoconferencing devices, set top boxes, gaming consoles, wearable computing devices, smartwatches, etc. Reference to specific client device types should therefore not be used to limit the scope of the present disclosure. In some examples, devices 443A-443F may represent user devices 130-150 depicted in FIG. 1.

Data center 301 includes pod units 1A and 2A, a common database (CDB) 407A, a message storage system (MSS) 411A, a router 413A, and a global user directory (GUD) 415A. Additional pod units (not shown) may also be included in data center 301. Data center 302 is similarly configured and includes components that operate substantially the same as those in data center 301. Data centers 301 and 302 provide backup and redundancy to one another in the event of failure.

Communication servers 319 provide telecommunication services (e.g., voice, video, email, and/or facsimile) to corresponding subsets of users. Each server 319 may also provide other services including, for example, user account management and configuration, billing services, accounting services, etc. Each pod unit includes an account database 321 to support the communication server(s) for that particular pod unit, storing configuration details and other information regarding each user's account. In some example, the functionalities of server 110 can be implemented in servers 319, and the functionalities of database 120 can be implemented in account databases 321.

Pod units 1A and 1B are in communication with one another so that the data on their respective account databases are synchronized across data centers. Data center 301 includes router 413A to receive an incoming service request 431A from network 417. Router 413A parses the incoming service request to identify or extract a user key and queries GUD 415A to determine which pod is associated with the user key. Router 413A also routes the service request to the pod unit in the data center associated with the identified pod. If, for example, the pod unit associated with the identified pod is not associated with data center 301, router 413A routes the service request to another data center (e.g., data center 302 as indicated by the arrow 441A).

Each pod unit of the data center 301 is also coupled to MSS 411A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 411A are synchronized with other data centers (e.g., synchronized with MSS 411B of data center 302).

Each pod unit in data center 301 is coupled to common database 407A which stores shared data for all of the pods, and stores consolidated information from account databases 321. Common database 407A also facilitates changes to the pod databases. For example, common database 407A may store data for applications that provide the services on communication servers 319. Different versions of the applications data may be stored in common database 407A, allowing changes and upgrades to communication servers 319 to be implemented efficiently and conveniently. Changes may be made to common database 407A and propagated to pod units 1A and 2A. Common database 407A is synchronized across data centers to other common databases (e.g., common database 407B of data center 302). Common database 407A, MSS 411A, router 413A, and GUD 415A form a common layer of resources that are shared by all pod units in data center 301.

Figure 5:
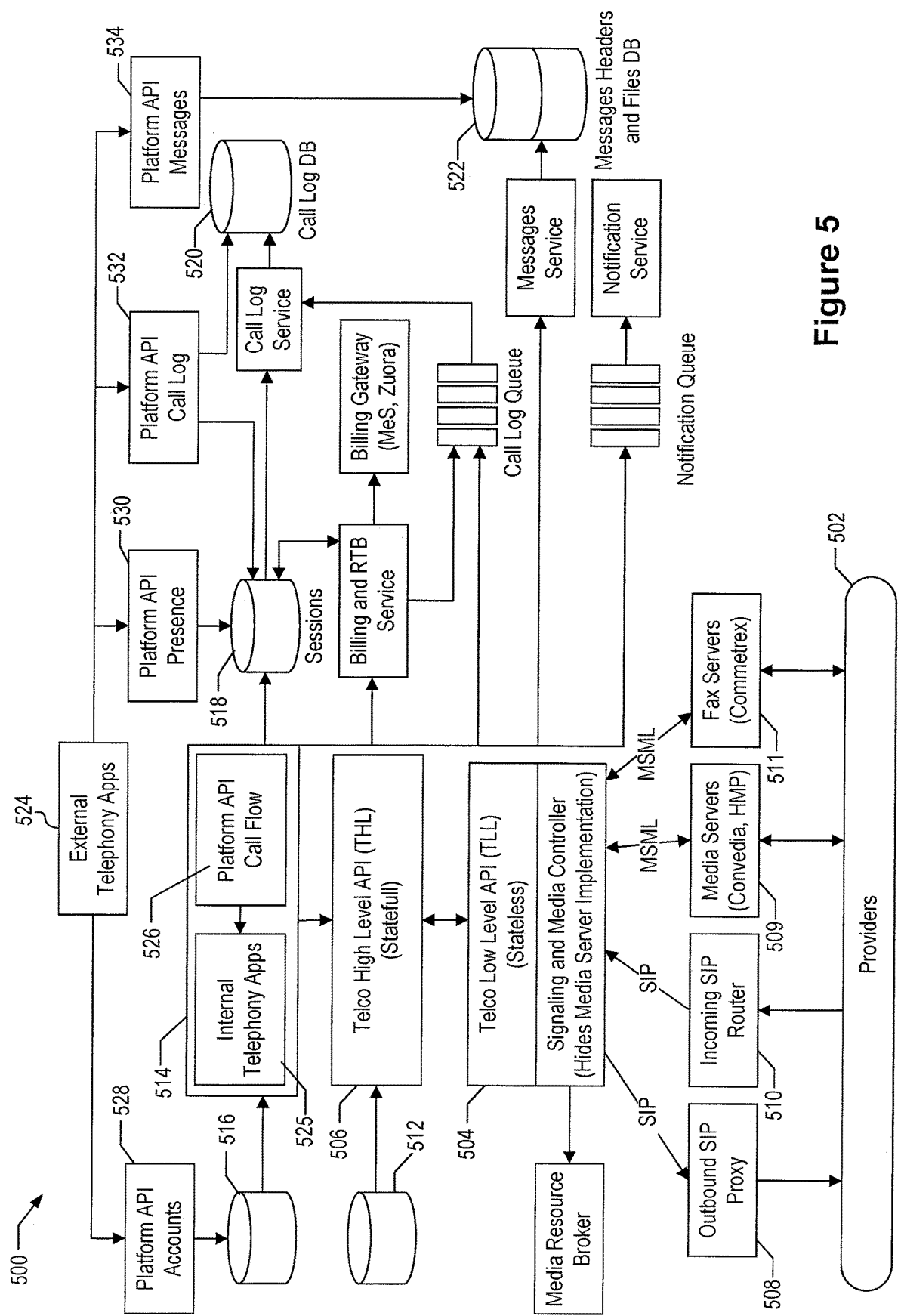
FIG. 5 is a simplified block diagram of an example of a telephony services platform employing techniques as described herein.

FIG. 5 is a simplified block diagram of an example of a PBX platform (e.g., communication system 300 of FIGS. 3 and 4) employing techniques for making common services available to endpoints as described herein. PBX platform 500 provides telephony services that allow communication among its users, and between its users and users associated with a variety of external telephony providers 502 via telecommunication APIs 504 and 506, outbound SIP proxy 508, and incoming SIP router 510. Media servers 509 and fax servers 511 provide functionality for processing voice over IP and fax over IP data, respectively. Telco low level API 504 is a stateless low-level API that provides signaling and media telephony primitives including, for example, call answering, placing of outbound calls, creation of conference call objects, addition of calls to conference call objects, playback of media for active calls, recording of active calls, etc. Telco high level API 506 is a higher-level API that has more sophisticated functionality such as, for example, interactive voice response (IVR), call forwarding, voice mail, etc. In the depicted implementation, telco API high level 506 doesn't have access to the PBX platforms databases, but maintains session context data of session context DB 512 to support its functionality. Telco high level API 506 may include function primitives which can be used to support the development of telephony applications.

Outbound SIP proxy 508 and incoming SIP router 510 employ SIP, an IETF-defined signaling protocol widely used for controlling communication sessions such as voice and video calls over IP. SIP can be used for creating, modifying and terminating two-party (unicast) or multiparty (multicast) sessions, and may be one of the core protocols employed by systems configured as shown in and described above with reference to FIGS. 3 and 4.

The core functionality of PBX platform 500 (e.g., as described above with reference to FIGS. 3 and 4) is accessed via telephony services block 514 which has access (not entirely shown for clarity) to the various data repositories of PBX platform 500, e.g., account database (DB) 516, sessions DB 518, call log DB, 520 and messages headers and files DB 522. Telephony services block 514 receives commands from telephony applications 524 and controls execution of the commands on the PBX platform 500. Telephony services block 514 can also include internal telephony applications 525 that are hosted and/or developed on or in connection with PBX platform 500. The depicted implementation also includes various APIs that allow external telephony applications 524 to interact with PBX platform 500. The APIs associated with PBX platform 500 allow telephony applications 524 and 525 to integrate with basic functionality of PBX platform 500 at multiple integration points, to control call flows during execution of the call flows by the platform (e.g., via API 526), and to access platform data (e.g., in DBs 516-622 via APIs 528-634).

Figure 6:
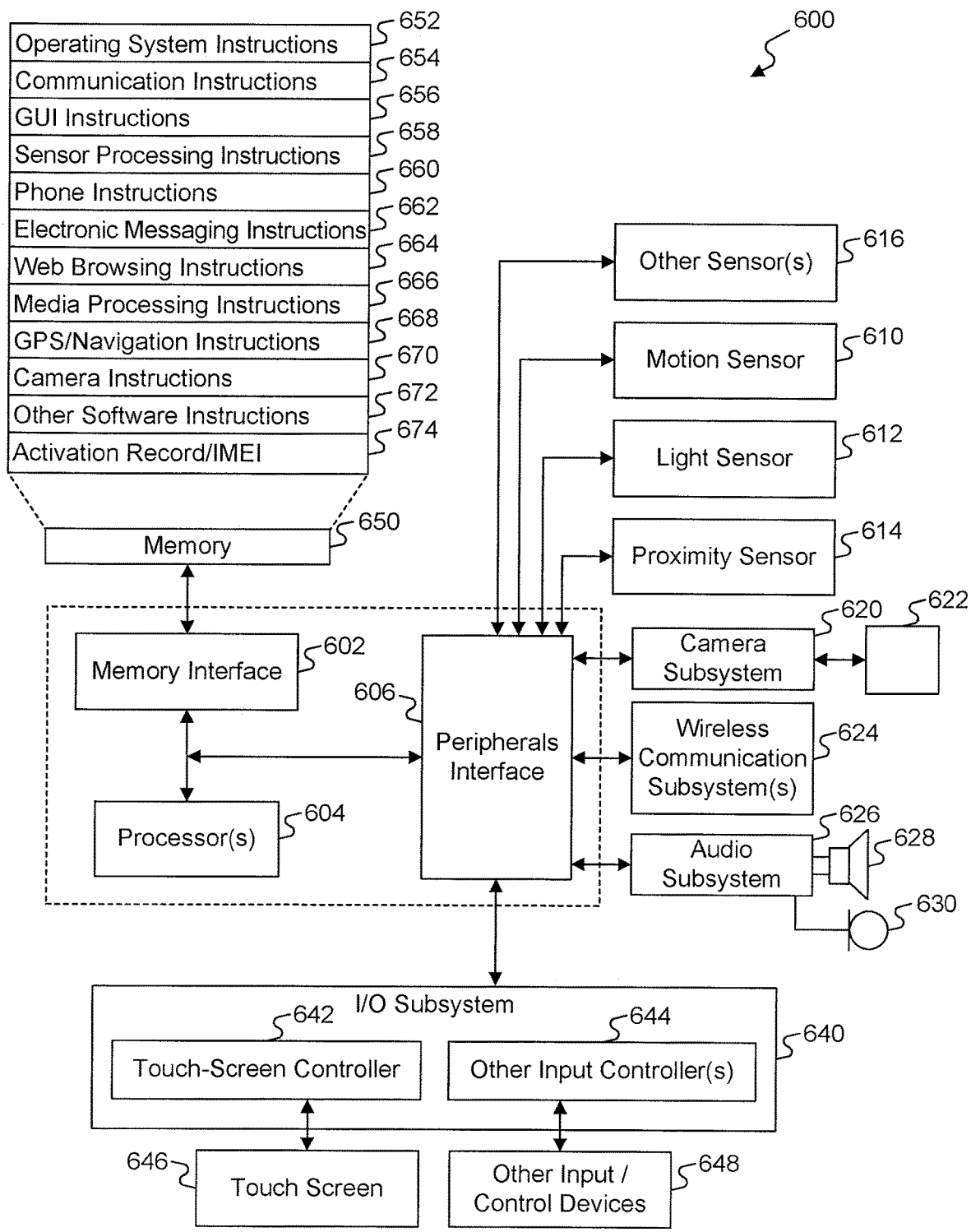
FIG. 6 is a diagram of an example mobile system environment for implementing embodiments consistent with the present disclosure.

FIG. 6 is a block diagram of an example architecture 600 of a mobile device, which can function as any of the user devices depicted in FIG. 1 (e.g., user devices 130, 140, and 150). The mobile device can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the mobile device can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a positioning system (e.g., GPS receiver), a temperature sensor, a biometric sensor, or other sensing device, to facilitate related functionalities. A GPS receiver can be integrated with, or connected to, a mobile device.

A camera subsystem 620 and an optical sensor 622, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the mobile device is intended to operate. For example, a mobile device can include communication subsystems 624 designed to operate over a GSM network, a GPRS network, an EDGE network, a Wi-Fi or WiMax network, and a Bluetooth® network. In particular, the wireless communication subsystems 624 can include hosting protocols such that the mobile device can be configured as a base station for other wireless devices.

An audio subsystem 626 can be coupled to a speaker 628 and a microphone 630 to facilitate voice-enabled functions, such as voice recognition, voice replication, digital recording, and telephony functions.

The I/O subsystem 640 can include a touch screen controller 642 and/or other input controller(s) 644. The touch-screen controller 642 can be coupled to a touch screen 646. The touch screen 646 and touch screen controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In some implementations, a pressing of the button for a first duration can disengage a lock of the touch screen 646; and a pressing of the button for a second duration that is longer than the first duration can turn power to the mobile device on or off. The user can be able to customize a functionality of one or more of the buttons. The touch screen 646 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks. The operating system 652 can include instructions for handling basic system services and for performing hardware dependent tasks. In some implementations, the operating system 652 can be a kernel (e.g., UNIX kernel).

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; and/or other software instructions 672 to facilitate other processes and functions, e.g., peer-to-peer communication functions as described in reference to FIG. 2. In some implementations, the media processing instructions 666 are divided into audio processing instructions and video processing instructions to facilitate audio processing-related processes and functions and video processing-related processes and functions, respectively. An activation record and International Mobile Equipment Identity ("IMEI") 674 or similar hardware identifier can also be stored in memory 650.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the mobile device can be implemented in hardware and/or in software, including in one or more signal processing and/or application specific integrated circuits.

Figure 7:
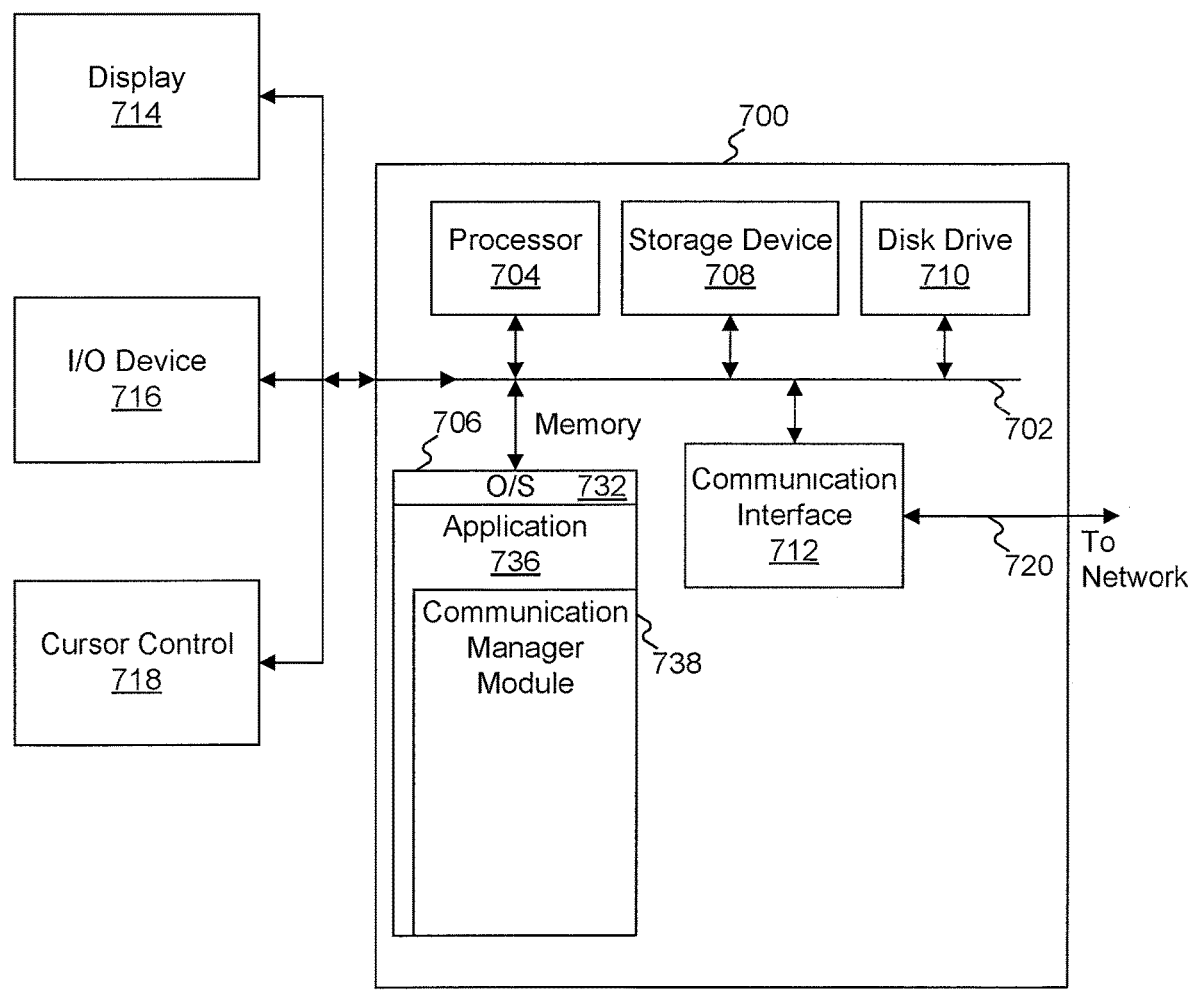
FIG. 7 is a diagram of another example system environment for implementing embodiments consistent with the present disclosure.

FIG. 7 illustrates an example computer system suitable for initiating or facilitating peer-to-peer communications, according to at least one embodiment. In some examples, computer system 700 can be used to implement computer programs, applications, methods, processes, or other software to perform the above-described techniques and to realize the structures described herein, such as communication unit 105 or server 110, as well as user devices 130-150. Computer system 700 includes a bus 702 or other communication mechanism for communicating information, which interconnects subsystems and devices, such as one or more processors 704, system memory ("memory") 706, storage device 708 (e.g., ROM), disk drive 710 (e.g., magnetic or optical), communication interface 712 (e.g., a modem, Ethernet card, or any other interface configured to exchange data with a communications network), display 714 (e.g., CRT or LCD), input device 716 (e.g., keyboard), and pointer cursor control 718 (e.g., mouse or trackball).

According to some examples, computer system 700 performs specific operations in which processor 704 executes one or more sequences of one or more instructions stored in system memory 706. Such instructions can be read into system memory 706 from another computer readable medium, such as static storage device 708 or disk drive 710. In some examples, hard-wired circuitry can be used in place of or in combination with software instructions for implementation. In the example shown, system memory 706 includes modules of executable instructions for implementing an operation system ("O/S") 732, an application 736, and a communication manager module 738, which can provide the functionalities disclosed herein.

In some examples, execution of the sequences of instructions can be performed by a single computer system 700. According to some examples, two or more computer systems 700 coupled by communication link 720 (e.g., links to LAN, PSTN, or wireless network) can perform the sequence of instructions in coordination with one another. Computer system 700 can transmit and receive messages, data, and instructions, including program code (i.e., application code) through communication link 720 and communication interface 712. Received program code can be executed by processor 704 as it is received, and stored in disk drive 710, or other non-volatile storage for later execution.

In the preceding specification, various example embodiments have been described with reference to the accompanying drawings. It will, however, be evident that various modifications and changes can be made thereto, and additional embodiments may be implemented based on the principles of the present disclosure. The specification and drawings are accordingly to be regarded in an illustrative rather than restrictive sense.

For example, advantageous results still could be achieved if steps of the disclosed techniques were performed in a different order or if components in the disclosed systems were combined in a different manner or replaced or supplemented by other components. Other implementations are also within the scope of the following example claims.

What is claimed is:

1. A system for supporting communications sessions between peer devices, the system comprising:
   at least one communication interface;
   a database configured to store an inventory of service capabilities of peer devices, wherein for each service the inventory includes information about at least one of:
   a threshold upload speed;
   a threshold download speed;
   a preferred form for communication; and
   a preferred communication protocol; and
   at least one server in communication with the communication interface and the database, wherein the at least one server is configured to:
   receive a first request from a first peer device for an inventory of service capabilities of at least one second peer device; and
   send to the first peer device a service from the inventory of service capabilities to initiate a communications session with a second peer device based on the inventory of service capabilities of the second peer device.

2. The system of claim 1, wherein the at least one server is further configured to:
   receive a second request from the first peer device to initiate the communications session with the second peer device;
   forward the second request to the second peer device;
   upon receiving an acceptance message from the second peer device, establish the communications session between the first peer device and the second peer device.

3. The system of claim 2, wherein the at least one server is further configured to establish the communications session using a Session Initiation Protocol (SIP).

4. The system of claim 1, wherein the inventory of service capabilities is associated with at least two services from the group consisting of audio conferencing, video conferencing, screen sharing, text messaging, instant messaging, whiteboarding, and location sharing.

5. The system of claim 1, wherein the first request from the first peer device further includes user preference information that describes the communication preferences of a user associated with the first peer device.

6. The system of claim 1, wherein the at least one server is further configured to send information to the first peer device identifying a plurality of second peer devices available to engage in a communications session with the peer device.

7. The system of claim 6, wherein each of the plurality of second peer devices is identified as available when a current upload speed of each second peer device is greater than the threshold upload speed.

8. The system of claim 6, wherein each of the plurality of second peer devices is identified as available when each second peer device is coupled to the network communications via WiFi.

9. The system of claim 1, wherein the at least one server is further configured to send preference information to the first peer device associating each of the service capabilities in the inventory with a preference for communicating using the service.

10. The system of claim 9, wherein the preference information comprises a first preference for communicating using a service via a cellular network and a second preference for communicating using the service via WiFi.

11. A computer-implemented method for supporting communications sessions between peer devices the method performed by one or more servers and comprising:
    accessing a database storing an inventory of service capabilities of peer devices, wherein for each service the inventory includes information about at least one of:
        a threshold upload speed;
        a threshold download speed;
        a preferred form for communication; and
        a preferred communication protocol for communication;
    receiving a first request from a first peer device for an inventory of service capabilities of at least one second peer device; and
    sending to the first peer device a service from the inventory of service capabilities to initiate a communications session with a second peer device based on the inventory of service capabilities of the second peer device.

12. The computer-implemented method of claim 11, further comprising:
    receiving a second request from the first peer device to initiate the communications session with the second peer device;
    forwarding the second request to the second peer device;
    upon receiving an acceptance message from the second peer device, establishing the communications session between the first peer device and the second peer device.

13. The computer-implemented method of claim 11, further comprising:
    establishing the communications session between the first peer device and the second peer device using a Session Initiation Protocol (SIP).

14. The computer-implemented method of claim 11, wherein the first peer device is configured to initiate a peer-to-peer communications session with second peer device using the selected service.

15. The computer-implemented method of claim 11, wherein the first request further includes user preference information that describes the communication preferences of a user associated with the first peer device.

16. The computer-implemented method of claim 11, further comprising:
    sending information to the first peer device identifying a plurality of second peer devices available to engage in a communications session with the peer device.

17. The computer-implemented method of claim 16, wherein each of the plurality of second peer devices is identified as available when a current upload speed of each second peer device is greater than the threshold upload speed.

18. The computer-implemented method of claim 16, wherein each of the plurality of second peer devices is identified as available when each second peer device is coupled to the network communications via WiFi.

19. A computer-readable storage medium that comprises a set of instructions that are executable by at least one processor to cause the at least one processor to perform a method for supporting communications sessions between peer devices, the method comprising:
    accessing a database storing an inventory of service capabilities of peer devices, wherein for each service the inventory includes information about at least one of:
        a threshold upload speed;
        a threshold download speed;
        a preferred form for communication; and
        a preferred communication protocol for communication;
    receiving a first request from a first peer device for an inventory of service capabilities of at least one second peer device; and
    sending to the peer device a service from the inventory of service capabilities to initiate a communications session with a second peer device based on the inventory of service capabilities of the second peer device.

20. The computer-readable storage medium of claim 19, wherein the method further comprising:
    receiving a second request from the first peer device to initiate the communications session with the second peer device;
    forwarding the second request to the second peer device;
    upon receiving an acceptance message from the second peer device, establishing the communications session between the first peer device and the second peer device.

* * * * *